Oct. 7, 1969          L. P. VELOZ          3,471,693
ULTRA-VIOLET WATER PURIFIER CONTROL
Filed March 4, 1966
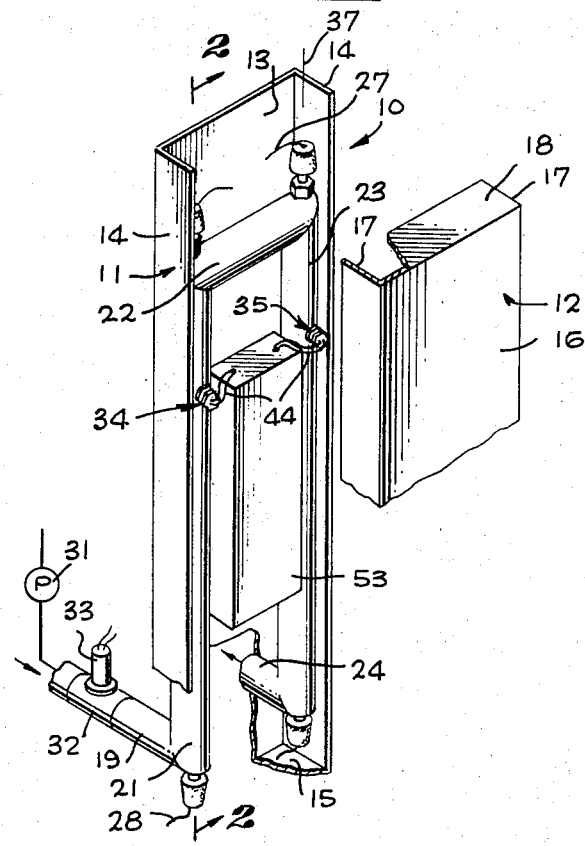
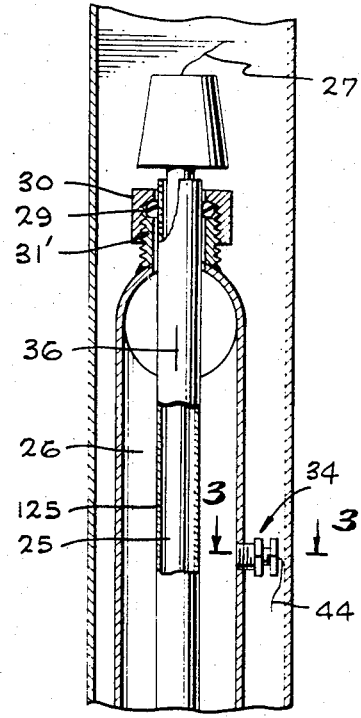
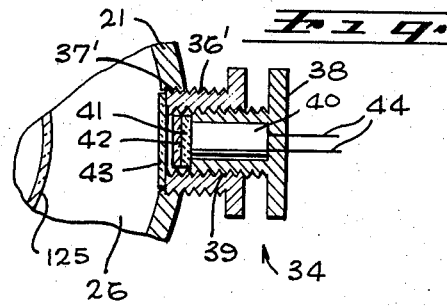
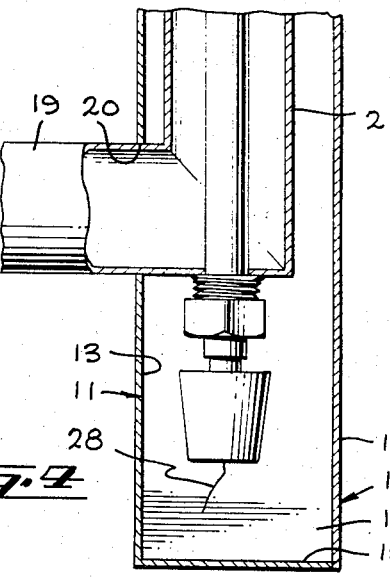
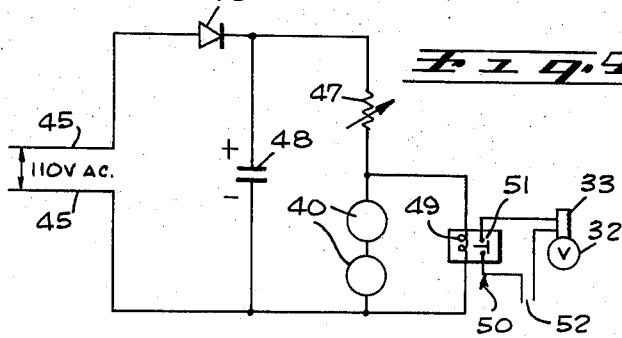
INVENTOR.
LOUIS P. VELOZ
BY
William P. Green
ATTORNEY

United States Patent Office 3,471,693
Patented Oct. 7, 1969

3,471,693
ULTRA-VIOLET WATER PURIFIER CONTROL
Louis P. Veloz, Pasadena, Calif., assignor to Aquafine Corporation, Los Angeles, Calif., a corporation of California
Filed Mar. 4, 1966, Ser. No. 531,945
Int. Cl. G01n 23/12, 21/26
U.S. Cl. 250—43.5      4 Claims

ABSTRACT OF THE DISCLOSURE

A fluid sterilizing system in which ultra-violet radiation is passed through a stream of liquid to sterilize it, with a radiation responsive sensing unit functioning to close off the flow of liquid automatically in response to a drop in the intensity of the radiation below a predetermined level, and with the automatic control system preferably being designed to return the shut-off valve to an open position in the event of an interruption in the supply of electricity to the system.

---

This invention relates to improved apparatus for sterilizing a fluid, such as water, by subjecting the fluid to ultra-violet radiation.

One of the most popular and direct methods of sterilizing water or the like is by ultra-violet radiation. In a system of this type, the water is directed past an ultra-violet lamp, in sufficiently close proximity to assure proper subjection of all of the water to ultra-violet radiation, with the radiation being of such intensity as to destroy any germs present in the water.

One objection which has frequently been encountered to the use of ultra-violet sterilizing systems has resulted from the difficulty of always assuring that the radiating lamp or lamps are in satisfactory condition to properly penetrate the entire fluid stream with the sterilizing radiation. After an extended period of use, a lamp may become progressively weaker in output, and may therefore become ineffective to fully sterilize the fluid. Similarly, the water or other fluid may itself contain impurities of a character tending to shield or filter out the ultra-violet radiation, so that the radiation cannot pass entirely through the liquid and fully sterilize it. Further, the ultra-violet lamp or a protective quartz sleeve thereabout may become dirty or coated with mineral deposits, and in this way filter out some or all of the ultra-violet energy. As a result, ultra-violet sterilizing devices have in the past not been considered completely reliable, in view of the fact that there has been no way of assuring at any particular instant that adequate and complete sterilization is being attained.

The present invention provides an automatic shutoff system which is automatically responsive to a condition of inadequate irradiation of the water to stop the flow of the fluid when such a condition develops. More specifically, the system includes an ultra-violet sensing unit which is positioned to receive radiation from the ultra-violet lamp or source, and which will respond to a predetermined decrease in the amount of received ultra-violet radiation (or to a complete cessation of such radiation) in a manner causing the fluid flow to be stopped. Preferably, the sensing unit is positioned so that the ultra-violet from the lamp must first pass through the fluid being treated before arrival at the sensing unit, so that the sensing unit will respond to a reduction in the amount of received ultra-violet radiation which may be caused by either a decrease in the efficiency of the lamp, or an increase in the amount of contaminants in the fluid, or a dirty lamp or lamp protector, or any combination of these conditions. The sensing unit may include a fluorescent substance adapted to fluoresce in response to the impingement of ultra-violet thereon, and combined with a photoelectric cell which then responds to the illumination of the fluorescent material to control a flow shut-off mechanism.

The actual element for closing off the flow of fluid may be an appropriate valve, desirably electrically actuated through an appropriate relay system by the sensing unit. The valve is preferably normally open, and is actuated to closed condition when proper irradiation is not being attained. It is a preferred arrangement, the fluid is passed sequentially through one or more tubes each containing an ultra-violet lamp, and each having a sensing unit for responding to ultra-violet from that lamp, and with the automatic control system being designed to close the shutoff valve in response to a predetermined decrease in the amount of radiation received from any of the lamps.

The above and other features and objects of the invention will be better understood from the following detailed description of the typical embodiment illustrated in the accompanying drawing, in which:

FIG. 1 is a perspective representation, partially broken away, of a water sterilizing system constructed in accordance with the invention;

FIG. 2 is an enlarged vertical section taken on line 2—2 of FIG. 1;

FIG. 3 is a further enlarged fragmentary horizontal section taken on line 3—3 of FIG. 2; and FIG. 4 is a diagrammatic representation of the automatic control circuit of the device.

Referring first to FIG. 1, I have illustrated at 10 a water sterilizing system of the ultra-violet type, having a vertically extending housing 11 adapted to be closed by a cover 12. Housing 11 may be formed of sheet metal, and have a vertical rear wall 13 and two forwardly projecting parallel vertical side walls 14, as well as a bottom wall 15. Cover 12 may similarly be formed of sheet metal, forming a front wall 16 adapted to close the forward side of housing 11, and having two opposite parallel vertical side walls 17 which are received at the outer sides of housing walls 14, with the top of the cover being closed by a top wall 18.

The water to be sterilized enters a lower portion of housing 11 through a horizontal inlet tube or conduit 19, which may extend forwardly through an opening 20 in rear wall 13 of the housing (see FIG. 2). Within the housing, tube 19 connects to the lower end of a vertical second tube 21, through which the water passes upwardly to flow into and through a horizontal tube 22, and to then pass downwardly through a second vertical tube 23, from whose lower end the water flows rearwardly and from the housing through a second horizontal tube 24.

In passing vertically within tubes 21 and 23, the water is sterilized by ultra-violet radiation from two elongated vertically extending quartz tube (mercury vapor) type ultra-violet lamps 25, which as can be seen best in FIG. 2 may be contained within protective quartz sleeves 125. These sleeves 125 and lamps 25 are desirably coaxial with the surrounding tubes 21 and 23, and spaced radially from those tubes to provide about each of the sleeves 125 an annular passage 26 through which the water flows in travelling through each of the tubes 21 and 23. Quartz tube lamps 25 are connected at their upper and lower ends to the usual electrical leads 27 and 28, through which current is fed to the lamps to energize them. The quartz sleeves 125 are appropriately sealed in fluid tight relation with respect to the conduit system formed by tubes 19, 21, 22, 23 and 24, to confine the water within the conduit system and against leakage therefrom. For this purpose, I may provide essentially conventional O-ring seals 29 about the upper and lower end portions of each sleeve 125, with these seals being tightenable into annular sealing engagement with the contacted parts by conventional threaded compression elements 30. The intensity of radiation emitted by lamps 25 is sufficient to assure effective sterilization of water passing through the system, that is, complete destruction of all bacteria and other living organisms, when lamps 25 are in proper operating condition.

The water is forced into inlet line 19 by an appropriate pressure source, typically represented in FIG. 1 as a pump 31. Connected into line 19 beyond the pump is a shutoff valve represented at 32, which is operable electrically by a solenoid or other actuating mechanism illustrated at 33.

For controlling the operation of the solenoid actuated valve 33, there are provided automatic ultraviolet sensing means, desirably including two sensing elements 34 and 35 connected into the two vertical water passing tubes 21 and 23 respectively. These sensing units 34 and 35 may be connected into the forward sides of tubes 21 and 23 respectively, and be directed radially inwardly toward the vertical axes 36 and 37 of those tubes, and therefore directly toward the two lamps 25. As seen best in FIG. 3, each unit 34 or 35 may be mounted within a tubular fitting 36' threadedly connected at 37' into the wall of the corresponding tube 21 or 23, and containing a second tubular threaded fitting 38, forming an outer housing of the unit 34 or 35, and threaded into fitting 36' at 39. Each of the tubular fittings 38 contains a photoelectric cell 40, which responds to the fluorescent illumination of a coating of fluorescent material 41 covering the outer side (right side as viewed in FIG. 3) of a quartz filter window 42. Filter 42 is designed to pass only ultra-violet radiation therethrough, and will filter out any other radiation reaching that location. A second quartz window 43 may be provided at the inner end of tubular fitting 36', and be sealed annularly with respect thereto, to function as a water tight window for preventing the leakage of any water outwardly within fitting 36'. The fluorescent material (phosphor) 41 is adapted to fluoresce in response to the impingement of ultra-violet radiation on this material, after passing through windows 42 and 43, and the photoelectric cell 40 is in turn adapted to respond to such fluorescence in a manner reducing the electrical resistance through the photoelectric cell and within a circuit connected to leads 44 of the cell.

Referring now to the circuit diagram of FIG. 4, power may be supplied to the primary circuit from two leads 45, typically connected to a 110 volt alternating current power source. This alternating current is rectified by a rectifier diode 46, from which the resulting direct current is passed through an appropriate potential reducing resistor 47, typically adjustable and of about 35,000 ohms. A capacitor 48, typically 20 microfarad and rated for a potential of 150 volt D.C., may be connected across the resistor circuit, to regularize the output of the diode. The rectified current passes through the two photoelectric cells 40 in series, as seen in FIG. 4, but with the primary coil 49 of a relay 50 being shunted across these two photoelectric cells. When coil 49 is energized to a predetermined extent, it closes normally open contacts 51 of relay 50, and thereby closes an energizing circuit to the previously mentioned solenoid 33 of automatic valve 32, from an appropriate power source 52. Valve 32 is normally open, but when energized in this manner is closed. Relay 49 and units 46, 47 and 48 of the FIG. 4 circuit may be appropriately housed within a container 53 located between tubes 21 and 23 of FIG. 1.

To now describe the manner of operation of the apparatus, assume first of all that lamps 25 are in proper operating condition, and are energized, and are therefore emitting sufficient ultra-violet radiation through windows 42 and 43 and onto the fluorescent material 41 to cause substantial fluorescence of that material. This illumination of material 41 energizes the two photoelectric cells 40 to an extent causing them to maintain valve 32 in open condition. More specifically, when the photoelectric cells are energized in this manner, their reduced resistance enables sufficient current to pass through these cells to prevent actuation of the shunt connected relay 50. Thus, contact 51 of the relay is maintained in open condition, and the normally opened valve 32 remains open so that water under pressure may pass this valve and flow into the conduit system of FIG. 1 through line 19. This water flows upwardly through tube 21, then horizontally through tube 22, then downwardly through tube 23, and out through discharge tube 24, and during this flow it is sterilized by its passage about the two ultra-violet lamps 25. So long as the sterilizing process continues in the intended manner valve 32 remains open, and the flow continues as described.

If one of the lamps 25 burns out, or loses some of its ultra-violet intensity, the resultant decreased illumination of the corresponding one of the photoelectric cells 40 causes an increase in the resistance of the current path through the photoelectric cells, so that an increased amount of current flows through relay coil 49, and actuate this relay to energize solenoid 33 and close valve 32. The apparatus is so designed that the valve will close only when the combined radiation level from the two ultra-violet lamps 25 has fallen to a value low enough to no longer assure complete sterilization of the water. Thus, when sterilization is incomplete, the water is shut off, so that a user is protected against delivery through the system of improperly treated water. In addition to responding to a decrease in effectiveness of the lamps 25, the system will also respond if the water itself becomes unclear to an extent filtering out enough of the ultra-violet radiation to prevent complete sterilization of the water, or when the lamps are dirty or sleeves 125 are coated with mineral deposits sufficient to reduce the ultra-violet transmission to below minimum requirements. When the water is shut off automatically for any of these reasons, the user may correct the situation, either by cleaning or replacing one or both of the lamps, cleaning sleeves 125, or correcting the situation which has caused discoloration of the water, following which the circuit will automatically return to its initial condition in which valve 32 is open. If at any time the supply of electrical power to the circuitry through lines 45 fails, normally open valve 33 remains open in spite of this power failure, and thus avoids interruption of the supply of water through the apparatus under such emergency conditions.

It is contemplated that deflector means will normally be provided in conjunction with the water conducting tubes or conduits 21 and 23 for causing the water to spiral as it passes vertically about each of the lamps 25. For instance, a helical screw type deflector may be utilized for this purpose. However, for clarity of illustration, no such deflector has been shown in the present drawing.

I claim:

1. A fluid sterilizing system comprising means forming a passage through which a fluid to be sterilized passes, an ultra-violet source positioned to emit ultra-violet radiation into said fluid as it flows through said passage to thereby sterilize the fluid, ultra-violet snesing means positioned to recive and respond to ultra-violet radiation which is emitted by said source and has passed through said fluid, a normally open shut-off valve operable when closed ot stop the flow of fluid through said passage, and automatically control circuitry for said valve energizable by electricity and responsive to said sensing means to automatically close said normally open valve if the ultra-violet radiation received by said sensing means falls below a predetermined safe level while electricity is being supplied to the circuitry, said circuitry and said normally open valve requiring both that the circuitry be receiving electrical power and that the radiation be below said safe level in order to actuate the valve to or maintain it in closed condition, whereby the valve remains open to flow of fluid through said passage upon an interruption in the supply of electricity to the circuitry, and whereby the valve also remains open when electricity is being supplied to the circuitry so long as the ultra-violet radiation received by said sensing means is up to said predetermined safe level.

2. A fluid sterilizing system as recited in claim 1, in which said control circuitry includes a solenoid operable when energized to actuate said shut-off valve from its normally open position to closed position.

3. A fluid sterilizing system as recited in claim 1, in which said control circuitry includes a solenoid operable when energized to actuate said shutoff valve from its normally open position to closed position, and means for automatically energizing said solenoid upon a drop in said radiation received by said sensing means below said predetermined level.

4. A fluid sterilizing system as recited in claim 1, in which said control circuitry includes electrically energized means for closing said valve, a relay operable upon energization of its primary to close a circuit through its secondary to said electrically energized means and to thereby close said valve, and means forming a shunt circuit across said primary for by-passing current about the primary and thereby opening the relay upon receipt by said sensing means of ultra-violet radiation above said predetermined level.

References Cited

UNITED STATES PATENTS

| 3,182,193 | 5/1965 | Ellner et al. | 250—43.5 |
| 3,117,842 | 1/1964 | Dewey | 23—230 XR |
| 3,287,089 | 11/1966 | Wilburn | 23—230 XR |
| 2,298,124 | 10/1942 | Hartman | 250—45 |
| 3,413,465 | 11/1968 | Harrison et al. | 250—43.5 |

FOREIGN PATENTS 674,555  11/1963  Canada.

OTHER REFERENCES

Watanabe K; Journal of Chemical Physics; volume 22 number 9; September 1954, pages 1564–1570 relied on.

MORRIS O. WOLK, Primary Examiner

BARRY S. RICHMAN, Assistant Examiner

U.S. Cl. X.R.

21—102; 23—230; 250—45